(12) United States Patent
Castillon Levano

(10) Patent No.: US 7,028,560 B2
(45) Date of Patent: Apr. 18, 2006

(54) METHOD TO LINEARLY MEASURE GAS VOLUME FLOW IN DUCTS AND FLOW SENSOR

(75) Inventor: Claudio Bruno Castillon Levano, San Juan de Miraflores (PE)

(73) Assignee: Pontificia Universidad Católica del Peru, San Miquel (PE)

( * ) Notice: Subject to any disclaimer, the term of this patent is extended or adjusted under 35 U.S.C. 154(b) by 40 days.

(21) Appl. No.: 10/602,202

(22) Filed: Jun. 24, 2003

(65) Prior Publication Data
US 2004/0261540 A1    Dec. 30, 2004

(51) Int. Cl.
G01F 1/28    (2006.01)

(52) U.S. Cl. .................................................. 73/861.74

(58) Field of Classification Search ............. 73/861.53, 73/861.54, 861.55, 861.74

See application file for complete search history.

(56) References Cited

U.S. PATENT DOCUMENTS

| | | | | |
|---|---|---|---|---|
| 4,083,245 A | * | 4/1978 | Osborn | 73/861.53 |
| 4,197,857 A | * | 4/1980 | Osborn | 600/531 |
| 4,989,456 A | * | 2/1991 | Stupecky | 73/863.53 |
| 5,033,312 A | * | 7/1991 | Stupecky | 73/861.53 |
| 5,038,621 A | * | 8/1991 | Stupecky | 73/861.53 |

* cited by examiner

*Primary Examiner*—Edward Lefkowitz
*Assistant Examiner*—Jewel V. Thompson
(74) *Attorney, Agent, or Firm*—Dodds & Associates; John Dodds; Leea S. Somersalo

(57) ABSTRACT

A method to linearly measure the flow of a gas in ducts, and a gas flow sensor using such a method are disclosed. In order to obtain a linear ratio between the differential pressure and the volumetric flow of a gas, a rectangular section elbow and a rectangular flexible plate located inside the elbow are used. When the flow goes through the duct linearization is obtained by combining the resistance of the duct and a variable-area obstruction caused by the plate. With linearization, it is possible to expand the measurement range of the gas flow in one duct. The sensor developed is used especially for the measurement of respiratory flow in medical applications.

4 Claims, 6 Drawing Sheets

SECTION A-A

SECTION B-B

SECTION C-C

METHOD TO LINEARLY MEASURE GAS VOLUME FLOW IN DUCTS AND FLOW SENSOR

BACKGROUND & CROSS REFERENCES TO RELATED APPLICATIONS

Not applicable to this application.

BACKGROUND: FEDERALLY SPONSORED RESEARCH

The invention subject matter of the present application was not a recipient of any federal support for its research and development.

REFERENCE TO MICROFICHE APPENDIX

Not applicable to this application.

1. Field of Invention

The invention comprises the development of a method to obtain a linear ratio between the differential pressure and the volumetric flow of a gas in conducts, and a sensor to measure the gas flow for medical applications using such method.

2. Discussion of Prior Art

There are several ways to measure the volumetric flow, for example, using differential pressure, thermal elements, magnetic elements, among others. The sensors used to measure volumetric flow by means of differential pressure include the Verituri Tube, plate-orifice and variable-area obstruction.

The current variable-obstruction-operating sensors are characterized by using a perpendicularly aligned flexible plate to the direction of the gas flow; when flow is increased, the plate bends generating an increase of the flow path area. This plate has a complex form in order to obtain the linearization between the variation of the differential pressure and the variation of flow.

U.S. Pat. No. 4,989,456, U.S. Pat. No. 5,038,621, U.S. Pat. No. 5,033,312, EP0373886, EP331772, EP331773, U.S. Pat. No. 4,083,245 and U.S. Pat. No. 4,197,857 reveal variable-area-obstruction flow sensors; due to the complex form of their plates, the variation of the differential pressure with regard to the variation of the volumetric flow is linear.

SUMMARY OF THE INVENTION

A method to linearly measure the flow of a gas in ducts, and a gas flow sensor using such method have been developed.

In order to obtain a linear ratio between the differential pressure and the volumetric flow of a gas, a rectangular section elbow (also referred to hereinafter as "the duct" and "the elbow-shaped duct") and a rectangular flexible plate located inside the duct are used. When the flow goes through the duct, linearization is obtained by combining the resistance of the duct and variable—area obstruction caused by the plate. With linearization, it is possible to expand the measurement range of the gas flow.

The sensor developed is used especially for the measurement of respiratory flow in medical applications. This sensor has a symmetric structure with regard to a cross section and is formed by three elbows, two tubular segments, a flexible plate and two spigots. The two outer elbows have a 45° angle and the intermediate elbow (the duct) has a 90° angle.

The rectangular flexible plate made of polyethylene is inserted in the distal curb of the 90° elbow, and matches the sensor's symmetrical plane at rest.

The two tubular segments are colinear and joined to the 45° angle elbow. The two spigots are located in these elbows and are positioned on the same side as the fixed edge of the plate. They are used to place a pressure transducer to take the differential pressure signals.

The sensor measures the volumetric flow in both directions and the results are approximately the same. This is due to the fact that the plate has a freedom of movement in both directions and the sensor is symmetric with regard to its cross section.

OBJECTIVES & ADVANTAGES

To develop a method to linearly measure volume flow in ducts.

To develop a sensor to measure gas volume flow with the following characteristics:

Linear ratio between the variation of the differential pressure and the variation of the respiratory volumetric flow.

Low resistance to flow.

Measurement of the volumetric flow in both directions.

ADVANTAGES

1. The two-direction flow sensor has a rectangular plate located in the middle of the sensor in a transversal position, which is deflected as the gas flow goes through, originating a variable obstruction based on the flow. This plate deflection is characterized by a low mechanical vibration, which allows more accurate measurements.
2. The ratio between the differential pressure and the flow is linear, which allows measuring a wide range of flow, without requiring any electronic conditioning. The linear ratio is the result of the interaction of the effects of the variable obstruction caused by the plate and the resistance to the flow passing through the elbow-shaped duct.

BRIEF DESCRIPTION OF THE INVENTION

A method has been developed to obtain a linear ratio between the differential pressure and the volumetric flow of a gas, and a sensor to measure gas flow for medical applications using such method.

The method allows to obtain a linear ratio between the differential pressure and the gas flow, using a rectangular-section elbow (the duct) and a rectangular flexible plate, that is, when the flow passes through the duct, linearization is obtained by combining duct resistance and variable-area obstruction caused by the plate. Pursuant to FIG. 1, the rectangular flexible plate has an edge that is fixed to the duct and the three remaining edges of the flexible plate are free (not fixed to the duct).

The sensor uses this method to linearize the ratio between the differential pressure and the volumetric flow. It has a symmetric structure with regard to its cross section and therefore measures the flow in both directions.

The design of the sensor includes the elbow described in the method (the duct), two elbows joined to the duct by their ends, a flexible plate and two spigots. These three elbows are consecutive and have a rectangular section, and redirect the flow in three stages; the two elbows jointly have a tubular segment at their ends for connection with other accessories. The rectangular-shaped flexible plate is located within the sensor, and matches the symmetry cross section at rest. Pursuant to FIGS. 3 and 4, the flexible plate has an edge that is fixed to the duct and the three remaining edges of the flexible plate are free (not fixed to the duct). The spigots through which the differential pressure signals will be obtained are parallel to each other and are located at the outer elbows, on the same side of the fixed edge of the plate.

This sensor is especially developed for Pulmonary Ventilators. Given that it measures the flow in both directions, it is used to measure the inspiration and expiration flow.

DETAILED DESCRIPTION OF THE INVENTION

OPERATION OF THE INVENTION

DESCRIPTION AND OPERATION OF ALTERNATIVE EMBODIMENTS

A.—Variable Obstruction Method

The various applications require to linearly measure the gas flow to predict its behavior and expand the flow measurement range in ducts.

Figure 1:
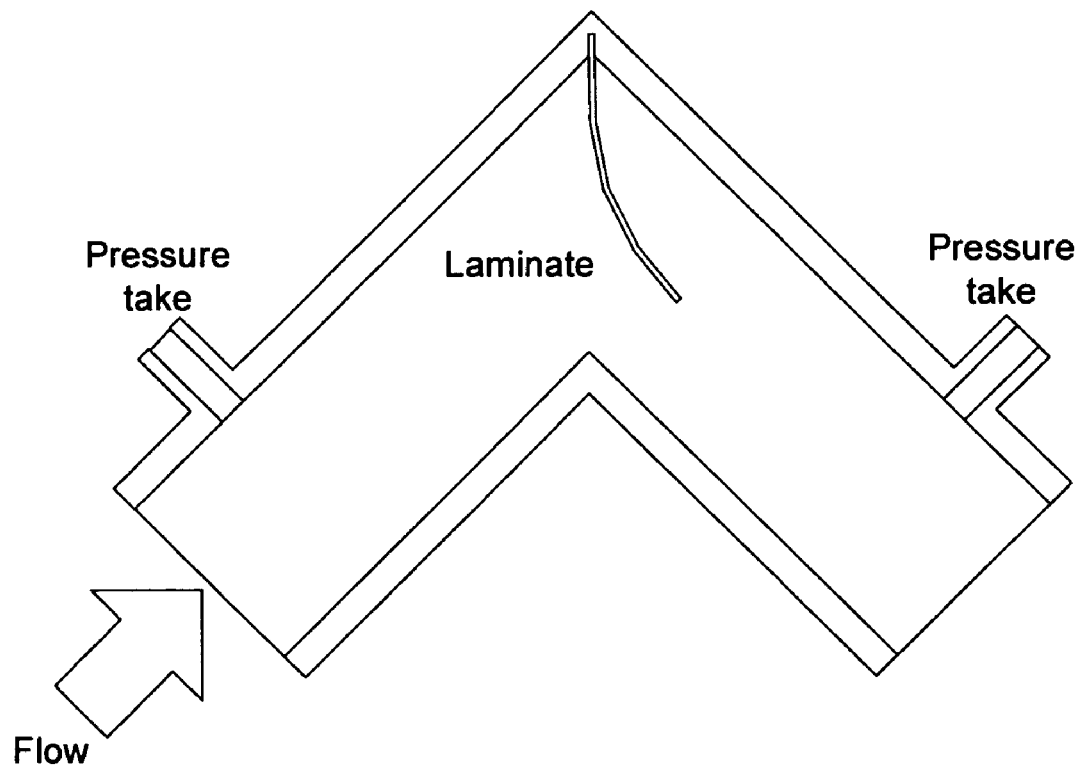
FIG. 1 shows the diagram of the method.
Figure 2:
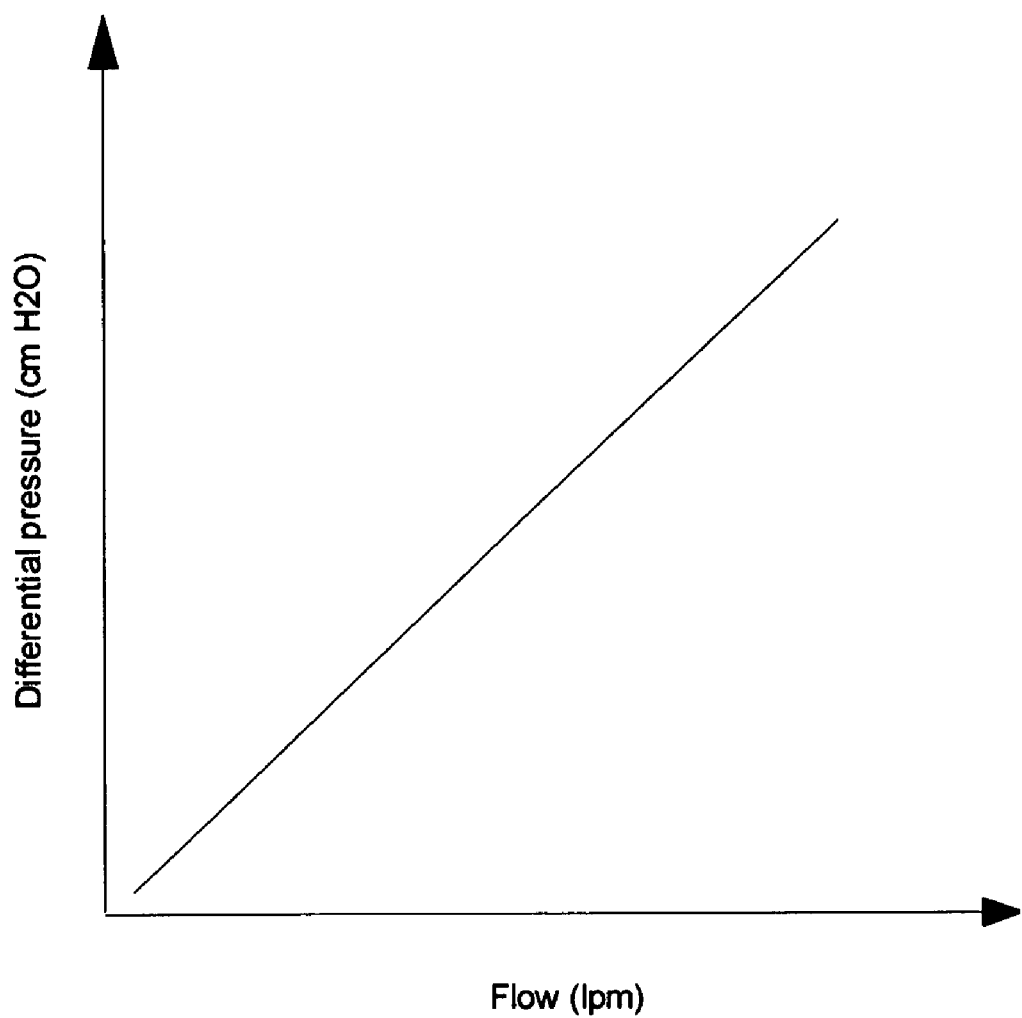
FIG. 2 shows the sensor design.

The method developed consists in using a rectangular section elbow (the duct) and a rectangular flexible plate located inside the duct (FIG. 1), in order to linearize the ratio between the differential pressure and the flow of a gas. The variable obstruction method uses the differential pressure to measure the gas volume flow; plate flexibility, duct shape and variation of the flow generate the pressure drop. At low flows, the loss of energy caused by the plate has a greater influence on the differential pressure than the one caused by the duct (slight bending of the plate); whereas, at high flows, the loss of energy generated by the duct shape has a greater influence on the differential pressure (the bending of the plate increases with regard to the bending at low flows).

B.—Gas flow measurement sensor

The development of the sensor to measure gas volume flow comprises the use of three elbows (the intermediate elbow being the duct), a flexible plate and two spigots, and to obtain such linear ratio the previous method is used. (The explanation will be made by using FIGS. 3 to 6). The flexible plate has four edges, wherein one edge is fixed to the duct, and the three remaining edges are free (not fixed to the duct).

Figure 3:
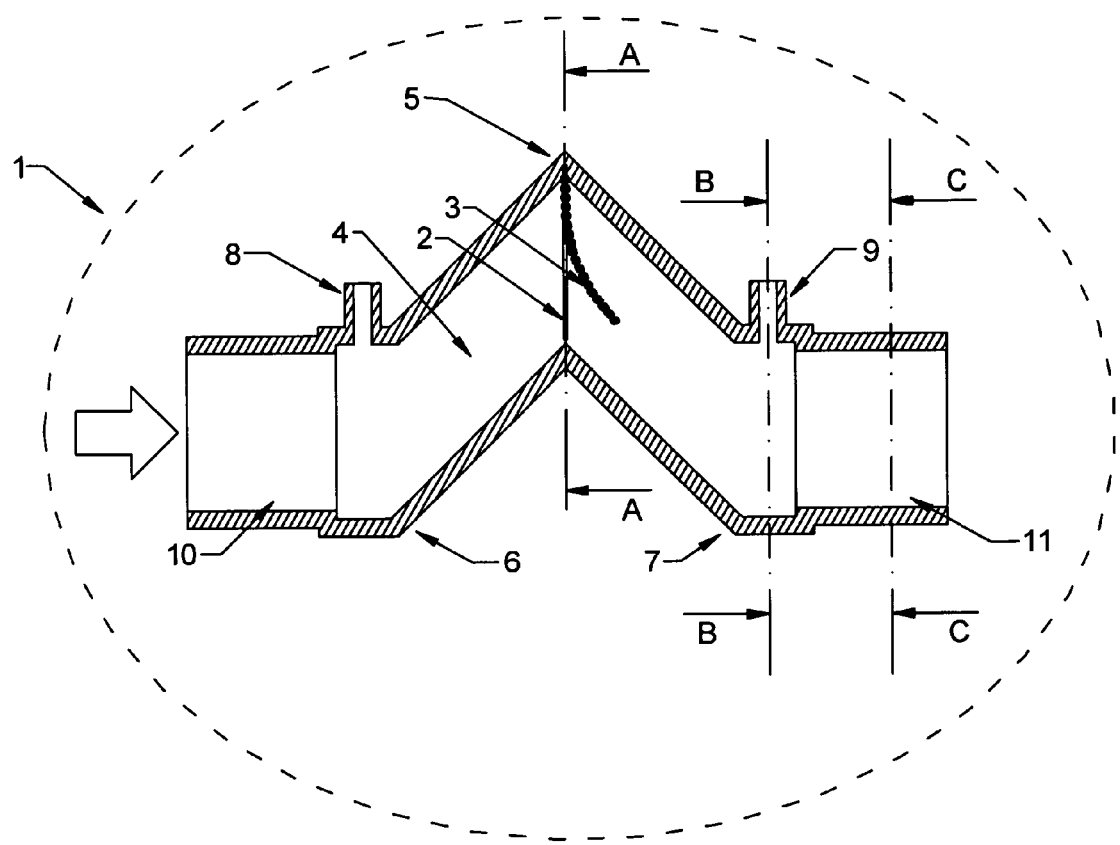
FIG. 3 shows a cross section of the flow sensor, where the flexible plate may be seen in its rest and working states.
Figure 4:
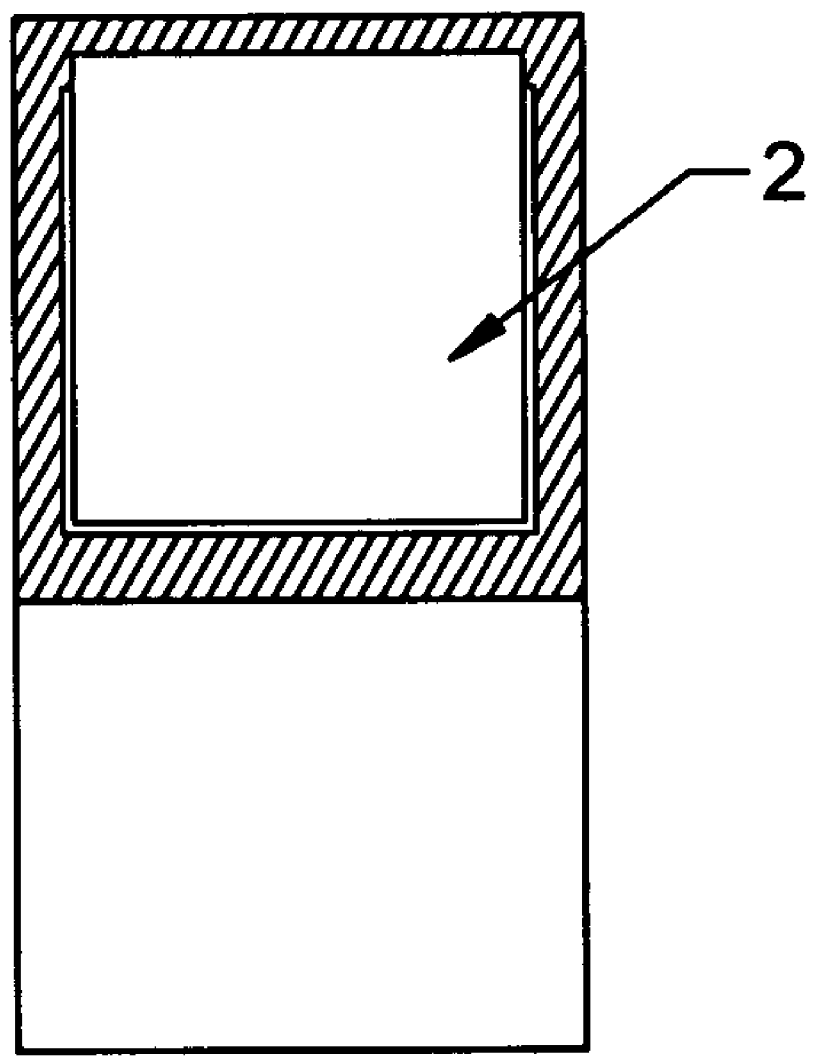
FIG. 4 shows the flexible plate at rest.
Figure 5:
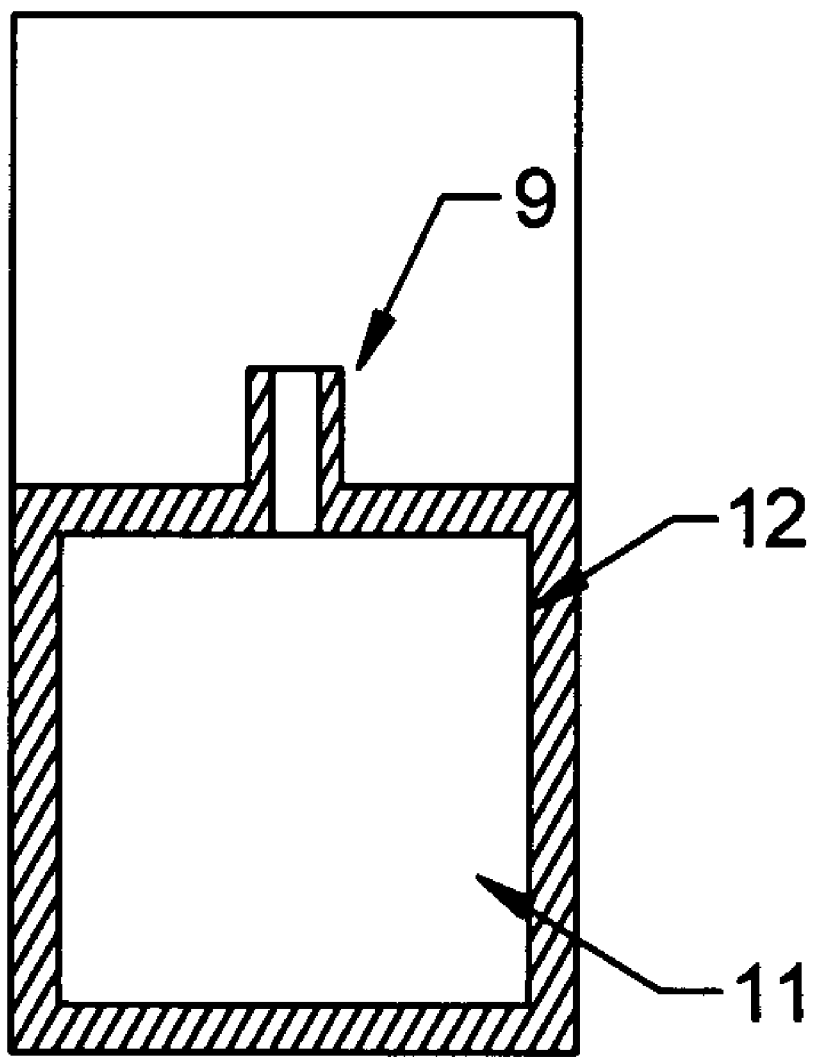
FIG. 5 shows a cross section of one of the spigots.

The sensor has a symmetric structure with respect to the cross section A-A (FIG. 3). It is formed by three elbows (5, 6, and 7, FIG. 3). The elbows at the ends (6 and 7) have a 45° angle and a tubular segment at their ends (10, 11), for connection with other accessories, the inflow (10) and outflow (11) segments are aligned to each other, and the intermediate elbow (5) is at a 90° angle. These elbows are used to redirect the flow in three stages.

This sensor has two spigots (8 and 9) which are parallel to each other, and are located at elbows 6 and 7. They are located on the same side of the rectangular section of the duct or insertion edge (curb) of the plate, and are used to connect a differential pressure transducer therein. The total sensor segment comprised between such spigots has a rectangular section.

The plate used is made of polymer, is flexible and 0.1 mm thick. It is rectangular-shaped and fixed at the distal curb of the intermediate elbow (the duct). FIG. 3 shows the plate at two stages, rest state 2 is shown while there is no flow circulating through the duct. At this stage the plate matches the symmetry cross section of the sensor. Stage 3 occurs when gas flow is circulating.

Figure 6:
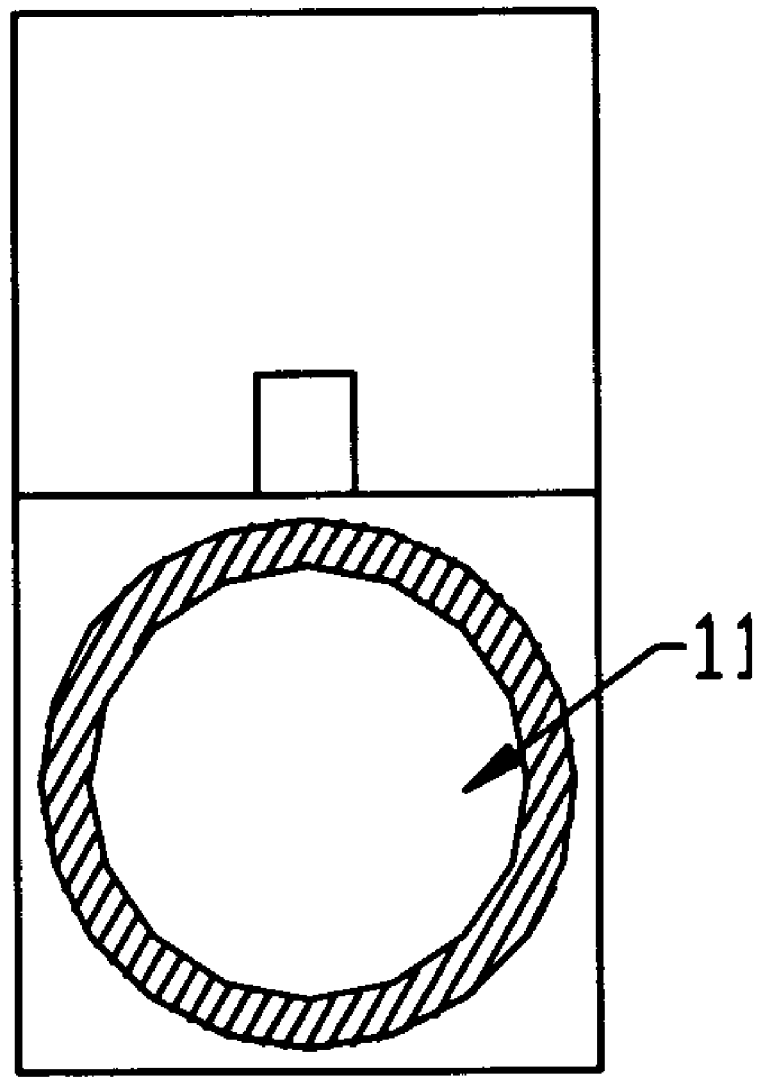
FIG. 6 shows a cross section of one of the tubular segments.

The rectangular shape and thickness of the plate (depends on the flow range intended to be measured) significantly reduces the vibration of the plate caused by the passing of the flow. The vibration of the flexible plates used in conventional sensors are not desirable because this phenomenon reduces the accuracy and reliability of measurements. In lab conditions, the range of displacement of the vibration of the free edge of the plate that is opposite to the plate edge fixed to the duct was below 0.5 mm when the sensor was at its upper limit of the measurement range (maximum flow). Furthermore, the shape and the thickness of the plate prevents the breaking of the polymer microscopic chains. This breaking phenomenon causes the plate to lose rigidity with the passing of time, and therefore, measurement repetition. FIG. 6 shows that the inflow and outflows segments (10 and 11) are tubular-shaped, and their diameters may be set up according to the desired application to the sensor. The diameters are to be chosen according to standardized values.

The sensor has a low resistance to gas flow due to the low loss of energy caused by the flexible plate.

The sensor is used especially to measure the respiratory flow.

The invention may be developed in other ways without drifting away from its fundamental characteristics.

The creation described is considered to be only illustrative and not restrictive. Therefore, the scope of the invention is prescribed more based on the following claims than based on the above description. Any change or variation regarding secondary details on what is intended to be conveyed in the claims is comprised within their scope.

CONCLUSION, RAMIFICATION & SCOPE OF INVENTION

The scope of the invention described herein is only provided as an example of the same. The above specifications shall not limit the scope of the invention for its scope shall be determined as described within the claims of the invention in this application.

LIST OF REFERENCE NUMERALS

This is not applicable to this application.

The invention claimed is:

1. A variable obstruction method to obtain a linear ratio between a differential pressure and gas volumetric flow of a gas, wherein such method uses a sensor that comprises:

a rectangular section elbow-shaped duct which includes a symmetry cross section;

a rectangular flexible plate located on the symmetry cross section of the duct;

and wherein the method involves using the flexible plate at a rest state matching the symmetry cross section of the duct, and wherein a useful range of the linear ratio is obtained by combining duct angle and rigidity of the plate.

2. A volumetric flow sensor for medical applications comprising:

an elbow-shaped duct having a transversal section of symmetry, with two elbows, wherein the first elbow is at a side of the duct and the second elbow is at the other side of the duct, and two aligned tubular inflow and outflow segments, and being capable of measuring a flow in both directions with similar results;

a flexible rectangular plate having four edges, wherein one of the plate edges is further fixed on the duct and the remaining three plate edges are free and not fixed to the duct;

and the plate matches the symmetry cross section of the sensor at rest;

and wherein amplitude of vibration of the free edge of the plate opposite to the plate edge fixed to the duct during passing of the flow is 0.5 mm when the sensor is at an upper limit of a measurement range.

3. A method to obtain a linear ratio between a differential pressure and gas volumetric flow, comprising:

a rectangular section elbow-shaped duct including a transversal section of symmetry;

a rectangular flexible plate with four edges; wherein the plate at a state of rest coincides with the transversal section of symmetry of the duct; wherein the plate is further fixed by one of the plate edges to an external edge of the duct; wherein the three remaining plate edges are free and not fixed to the duct;

and wherein a range for linear measurement of gas flow is determined by an angle of the duct and rigidity of the plate.

4. A volumetric flow sensor for medical applications that measures gas flow in a bidirectional manner with similar results and that has a useful measurement range with an upper limit, comprising:

an elbow-shaped duct of transversal section of rectangular shape;

two duct segments that are straight and of a square section aligned between each other, wherein each straight segment is fixed to each end of the duct originating an additional elbow at each union with the duct;

two tubular segments that extend from the straight segments; and a rectangular flexible plate that has four edges, wherein the location of the plate at state of rest coincides with the transversal section of symmetry of the duct, and wherein the plate is fixed on one of its edges to an external border of the duct, allowing the three remaining plate edges to be free and not fixed to the duct;

and wherein the amplitude of vibration of the free edge of the plate opposite to the plate edge fixed to the duct, during passing of the flow is 0.5 mm when the sensor is in the upper limit of useful measurement range.

* * * * *